(12) United States Patent
Hamer et al.

(10) Patent No.: US 12,510,431 B2
(45) Date of Patent: Dec. 30, 2025

(54) TRACTION OR FRICTION MEASUREMENT APPARATUS AND METHOD OF CALIBRATION

(71) Applicant: PCS Instruments Ltd, London (GB)

(72) Inventors: Clive Hamer, London (GB); John Hutchinson, London (GB)

(73) Assignee: PCS Instruments Ltd, London (GB)

( * ) Notice: Subject to any disclaimer, the term of this patent is extended or adjusted under 35 U.S.C. 154(b) by 276 days.

(21) Appl. No.: 17/627,748

(22) PCT Filed: Aug. 30, 2020

(86) PCT No.: PCT/EP2020/074169
§ 371 (c)(1),
(2) Date: Jan. 17, 2022

(87) PCT Pub. No.: WO2021/043697
PCT Pub. Date: Mar. 11, 2021

(65) Prior Publication Data
US 2022/0316975 A1    Oct. 6, 2022

(30) Foreign Application Priority Data
Sep. 8, 2019 (GB) .................................. 1912908

(51) Int. Cl.
G01L 25/00       (2006.01)
G01N 19/02       (2006.01)

(52) U.S. Cl.
CPC ............. G01L 25/00 (2013.01); G01N 19/02 (2013.01)

(58) Field of Classification Search
CPC ......... G01N 19/00; G01N 19/02; G01L 25/00
(Continued)

(56) References Cited

U.S. PATENT DOCUMENTS 5,377,525 A * 1/1995 Hutchinson ............ G01N 19/02
73/9
5,679,883 A 10/1997 Wedeven
(Continued)

FOREIGN PATENT DOCUMENTS

CN      103528945 A  *  1/2014
CN      107228629 A  *  10/2017  ............ G01B 11/06
(Continued)

OTHER PUBLICATIONS

M. Björling et al., "EHL friction mapping—the influence of lubricant, roughness, speed and slide to roll ratio", 2010. (Year: 2010).*
(Continued)

*Primary Examiner* — Laura Martin
*Assistant Examiner* — Nashmiya S Fayyaz
(74) *Attorney, Agent, or Firm* — Lippes Mathias LLP

(57) ABSTRACT

The invention relates to a traction or friction measuring apparatus and method of calibration. The apparatus comprising a flat disc traction surface; a spherical ball traction surface constructed and arranged to, in use, contact said disc traction surface; a support structure constructed and arranged to support said disc and ball traction surfaces with respect to one another whilst allowing relative rotational movement therebetween; about an axis, the disc drive means and ball drive operable to effect the relative movement between said disc and ball traction surfaces and include disc speed measuring means and ball speed measuring means, and thereby to generate a traction or friction force therebetween; and force measuring means associated with at least said disc and ball traction surfaces to provide a force measurement arising from said traction or friction force and that measurement of the ball speed and the disc speed can be made at a point of pure rolling between the ball and disc in order to accurately determine the disc track radius based on (Continued)

the known ball track radius. The method comprises the following steps: a. steadily increasing the disc speed and reduce the ball speed (or vice versa) in such a way as to ensure that at some point the speeds pass through a point where the disc and ball are in pure rolling, b. plotting traction force against the slide/roll ratio (SRR), c. observing and recording the values of the motor speeds that correspond to the point of transition from positive to negative (or negative to positive) traction force as the contact passes through pure rolling contact, and, d. determining the disc track radius (DTR) based on the formula: DTR=Ball speed× ball track radius/Disc speed.

12 Claims, 6 Drawing Sheets

(58) Field of Classification Search
USPC .................................................. 73/9, 10, 1
See application file for complete search history.

(56) References Cited

U.S. PATENT DOCUMENTS

| | | | | |
|---|---|---|---|---|
| 5,861,954 | A * | 1/1999 | Israelachvili | G01N 19/02 73/862.632 |
| 6,167,745 | B1 * | 1/2001 | Hamer | G01N 19/02 73/9 |
| 7,784,326 | B2 * | 8/2010 | Domeier | G01N 3/56 73/9 |
| 7,958,775 | B2 * | 6/2011 | Zahouani | G01N 19/02 73/9 |
| 8,051,699 | B2 * | 11/2011 | Linares | G01N 3/56 73/7 |
| 10,161,840 | B2 * | 12/2018 | Padgurskas | G01N 3/56 |
| 10,281,388 | B2 * | 5/2019 | Dube | G01N 3/56 |
| 10,761,078 | B2 * | 9/2020 | Conley | G01N 33/2888 |
| 11,249,007 | B2 * | 2/2022 | Deng | G01N 33/204 |
| 11,327,005 | B2 * | 5/2022 | Potier | G01N 19/02 |
| 11,428,625 | B2 * | 8/2022 | Zhang | G01N 3/56 |
| 11,768,149 | B2 * | 9/2023 | Zhang | G01N 33/30 73/10 |
| 2019/0161697 | A1 * | 5/2019 | Schwarz | C08G 73/0233 |
| 2022/0316975 | A1 * | 10/2022 | Hamer | G01N 19/02 |

FOREIGN PATENT DOCUMENTS

| | | | | |
|---|---|---|---|---|
| CN | 207456396 | U | * 6/2018 | |
| CN | 108168689 | B | * 7/2019 | G01H 17/00 |
| CN | 119334294 | A | * 1/2025 | |
| GB | 2194060 | A | * 2/1988 | G01N 19/02 |

OTHER PUBLICATIONS

Yasunori Shimizu et al., "The Influence of Slide-Roll Ratio on ZDDP Tribofilm Formation", Tribology Letters, Vo. 64, No. 19, Sep. 16, 2016. (Year: 2016).*
Doris N Khaemba et al, "The role of surface roughness and slide-roll ratio in the decomposition of MoDTC in tribological contacts", Journal of Physics D: Applied Physics, vol. 50, No. 8, 2017. (Year: 2017).*
Pawel Rycerz et al., "The Influence of Slide-Roll Ratio on the Extent of Micropitting Damage in Rolling-Sliding Contacts Pertinent to Gear Applications", Tribology Letters, Vo. 67, No. 63, May 11, 2019. (Year: 2019).*
S. Matkovič et al., "Effects of slide-to-roll ratio and temperature on the tribological behaviour in polymer-steel contacts and a comparison with the performance of real-scale gears", Wear Journal, vol. 477, Mar. 15, 2021. (Year: 2021).*
Yiming Han et al., "Effects of slide-to-roll ratio and varying velocity on the lubrication performance of grease at low speed", Journal of Engineering Tribology, vol. 235, No. 10, 2021. (Year: 2021).*
International Search Report, International application No. PCT/EP2020/074169, mailed Nov. 16, 2020.
Hansen Jonny et al: "Performance and mechanisms of silicate tribofilm in heavily loaded rolling/sliding non-conformal contacts", Tribology International, Elsevier Ltd, Amsterdam, NL, vol. 123, Mar. 10, 2018 (Mar. 10, 2018), pp. 130-141, XP085371663, ISSN: 0301-679X, DOI: 10.1016/J.TRIBOINT.2018.03.006.
Written Opinion International application No. PCT/EP2020/074169, mailed Mar. 11, 2021.

* cited by examiner

TRACTION OR FRICTION MEASUREMENT APPARATUS AND METHOD OF CALIBRATION

TECHNICAL FIELD

This invention relates to a friction measurement method and apparatus and, in particular, to a method and apparatus for measuring traction and/or friction forces between a rotating ball and a disc. Typical applications include fuel economy modelling of automotive engine oils, boundary additive evaluation, wear measurement and testing, soft contact investigation and various types of friction measurement for traction fluids.

BACKGROUND

A number of forms of apparatus have been proposed, in the past, for measuring or testing friction and/or traction forces. However, highly accurate measurement is difficult to achieve as known forms of measuring apparatus have in-built resistances, such as internal friction, differential thermal expansion and elastic deflections under load, and manufacturing tolerances which lead to variations from one set of apparatus to another, all of which can influence the forces the apparatus is attempting to accurately measure.

Traction in rolling/sliding contacts is usually determined by measuring torque applied to one of the rotating specimens or by measuring the reaction force felt by a body supporting one of the rotating specimens.

For the traction measurement it is required that the dimensions of the ball track radius and the disc track radius are accurately known in order to set the relative contact speeds of the ball and disc accordingly.

For practical purposes it may not be possible to entirely eliminate extraneous forces, manufacturing tolerances and differential thermal expansion. What is therefore required is a form of apparatus and method which provides improved accuracy in the measurement of the forces, notwithstanding the inherent variations.

It is an object of this invention to provide traction and/or friction testing method and apparatus in which any extraneous forces and variations inherent in the apparatus are accounted for such that any measurement of traction or friction force will be directly proportional to the actual force.

SUMMARY OF THE INVENTION

In one aspect, the invention comprises a method of calibrating a traction or friction measuring apparatus, said apparatus comprising a flat disc traction surface; a spherical ball traction surface constructed and arranged to, in use, contact said disc traction surface; a support structure constructed and arranged to support said disc and ball traction surfaces with respect to one another whilst allowing relative rotational movement therebetween; about an axis, the disc drive means and ball drive operable to effect the relative movement between said disc and ball traction surfaces and include disc speed measuring means and ball speed measuring means, and thereby to generate a traction or friction force therebetween; and force measuring means associated with at least said disc and ball traction surfaces to provide a force measurement arising from said traction or friction force and that measurement of the ball speed and the disc speed can be made at a point of pure rolling between the ball and disc in order to accurately determine the disc track radius based on the known ball track radius, characterised in the following steps:
  a. steadily increasing the disc speed and reduce the ball speed (or vice versa) in such a way as to ensure that at some point the speeds pass through a point where the disc and ball are in pure rolling,
  b. plotting traction force against the slide/roll ratio (SRR),
  c. observing and recording the values of the motor speeds that correspond to the point of transition from positive to negative (or negative to positive) traction force as the contact passes through pure rolling contact, and,
  d. determining the disc track radius (DTR) based on the formula:

$DTR$=Ball speed×ball track radius/Disc speed.

Preferably two traction measurements are made for each traction output value, a first traction measurement is taken at a positive slide/roll ratio (SRR), and a second traction measurement is taken at negative SRR, and wherein the second traction value is then subtracted from the first traction value and the result halved to give a true traction value by eliminating the effect of any offset drift.

Preferably either a dry contact between the traction surfaces, or a contact fluid is used that exhibits both a very steep traction slope at low SRR and a flat traction slope at higher SRR where the traction value is at a maximum.

The method of calibrating a traction or friction measuring apparatus may have the following further steps:
  i) establishing the zero traction force point, using a dry contact or contact fluid and making a measurement at a higher SRR where the traction value is at a maximum,
  ii) stepping through a series of progressively increasing and decreasing disc and ball speeds at low SRR either side of an estimated pure rolling speed using a dry contact or contact fluid according to claim 3 and recording the traction values,
  iii) recording the SRR at which the recorded traction value in step b) is equal to the zero traction force point in step a),
  iv) adjusting the disc track radius (DTR) such that the indicated SRR is equal to zero.

According to a further aspect of the invention there is provided a traction or friction measuring apparatus calibrated by the method of claim 1,
  characterised in that said apparatus comprising a flat disc traction surface; a spherical ball traction surface constructed and arranged to, in use, contact said disc traction surface; a support structure constructed and arranged to support said disc and ball traction surfaces with respect to one another whilst allowing relative rotational movement therebetween; about an axis, said apparatus including disc drive means and ball drive operable to effect the relative movement between said disc and ball traction surfaces and include disc speed measuring means and ball speed measuring means, and thereby to generate a traction or friction force therebetween; and force measuring means associated with at least said disc and ball traction surfaces to provide a force measurement arising from said traction or friction force and that measurement of the ball speed and the disc speed can be made at a point of pure rolling between the ball and disc in order to accurately determine the disc track radius based on the known ball track radius.

Preferably, the disc support means mounts said disc traction surface for rotation about a substantially vertical axis. The ball support means is mounted for pivotal movement about a substantially horizontal axis to permit said ball traction surface to be displaced into contact with said disc traction surface.

Preferably said ball support means further includes elastic flexure means constructed and arranged to permit elastic movement of said ball traction surface with respect to said disc traction surface in the direction of the resulting traction or friction force, yet resist movement of said ball traction surface in orthogonal directions.

The drive means may further include displacement means to variably displace said ball traction surface into contact with said disc traction surface in a direction normal to said disc traction surface. This displacement means is conveniently provided in part, by a stepper motor.

The force measuring means preferably comprises a linear force transducer mounted to detect the force at said ball traction surface due to a traction or friction force being generated between said disc and ball traction surfaces.

Many variations in the way the invention may be performed will present themselves to those skilled in the art. The only limitations on the scope of the invention should be imposed by the appended claims and not by the description of one preferred embodiment which follows.

DESCRIPTION OF PREFERRED EMBODIMENTS

Before commencing with a description of the apparatus and its operation, it is useful to define a few terms:

Slide/roll ratio (SRR) is general terms intended to mean the difference between the speeds of the traction surfaces divided by their average. In other words $$\frac{2(U1 - U2)}{U1 + U2}$$

Rolling speed is the average of the speeds of first and second traction surfaces, that is $$\frac{U1 + U2}{2}$$

Figure 1:
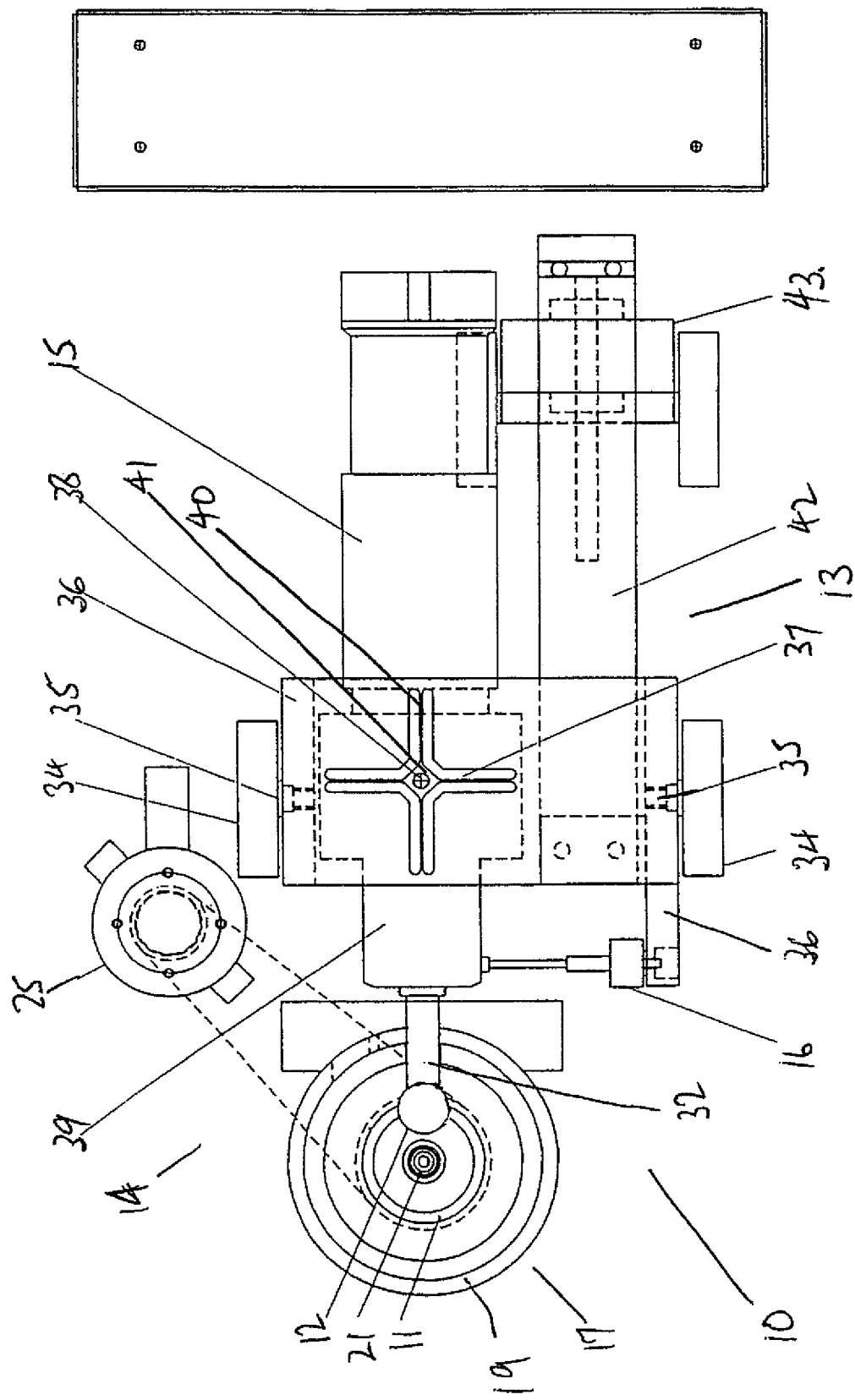
FIG. 1: shows a schematic plan view of measuring apparatus embodying the invention.
Figure 2:
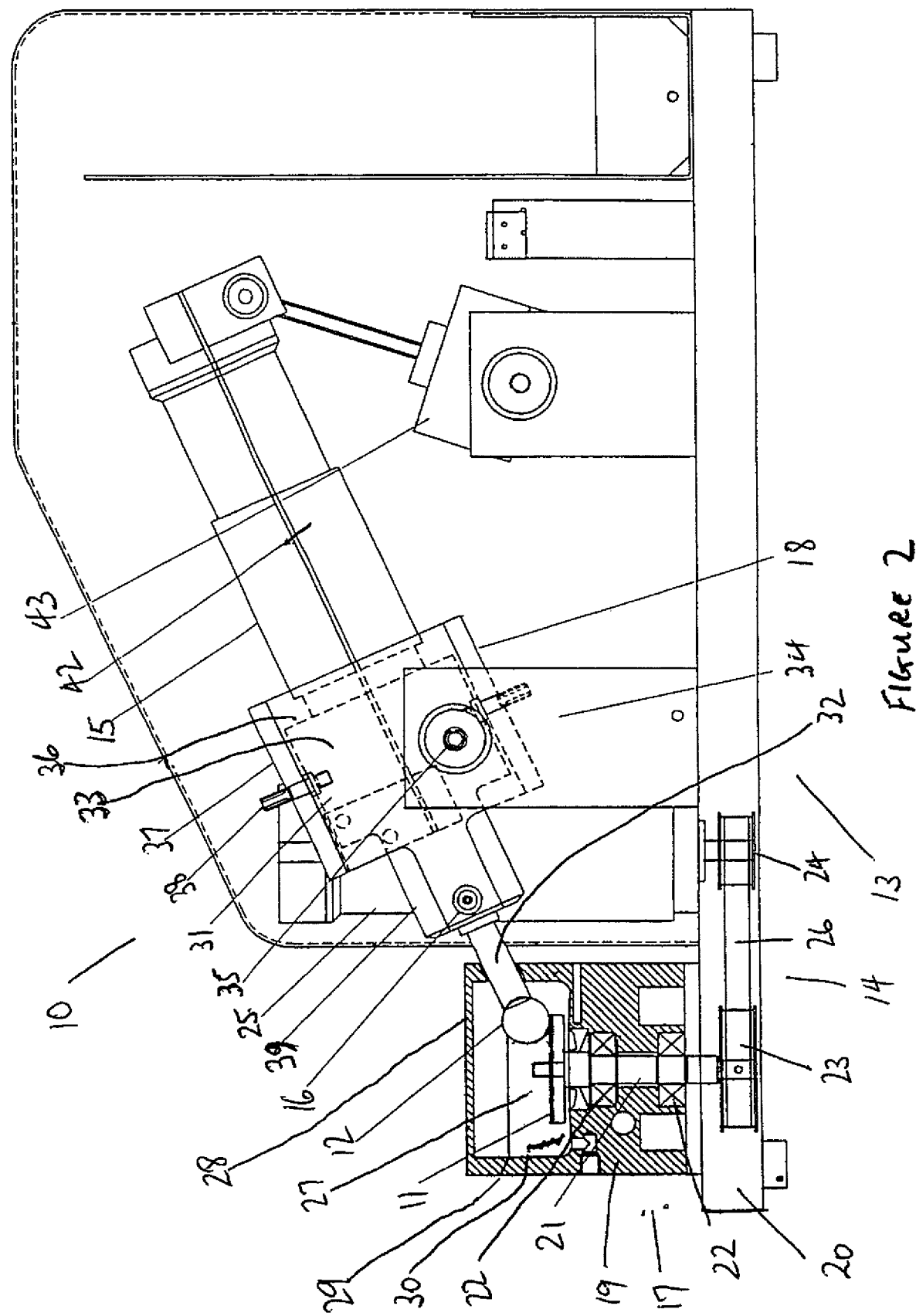
FIG. 2: shows a schematic side view, partly in section, of the measuring apparatus shown in FIG. 1.
Figure 3:
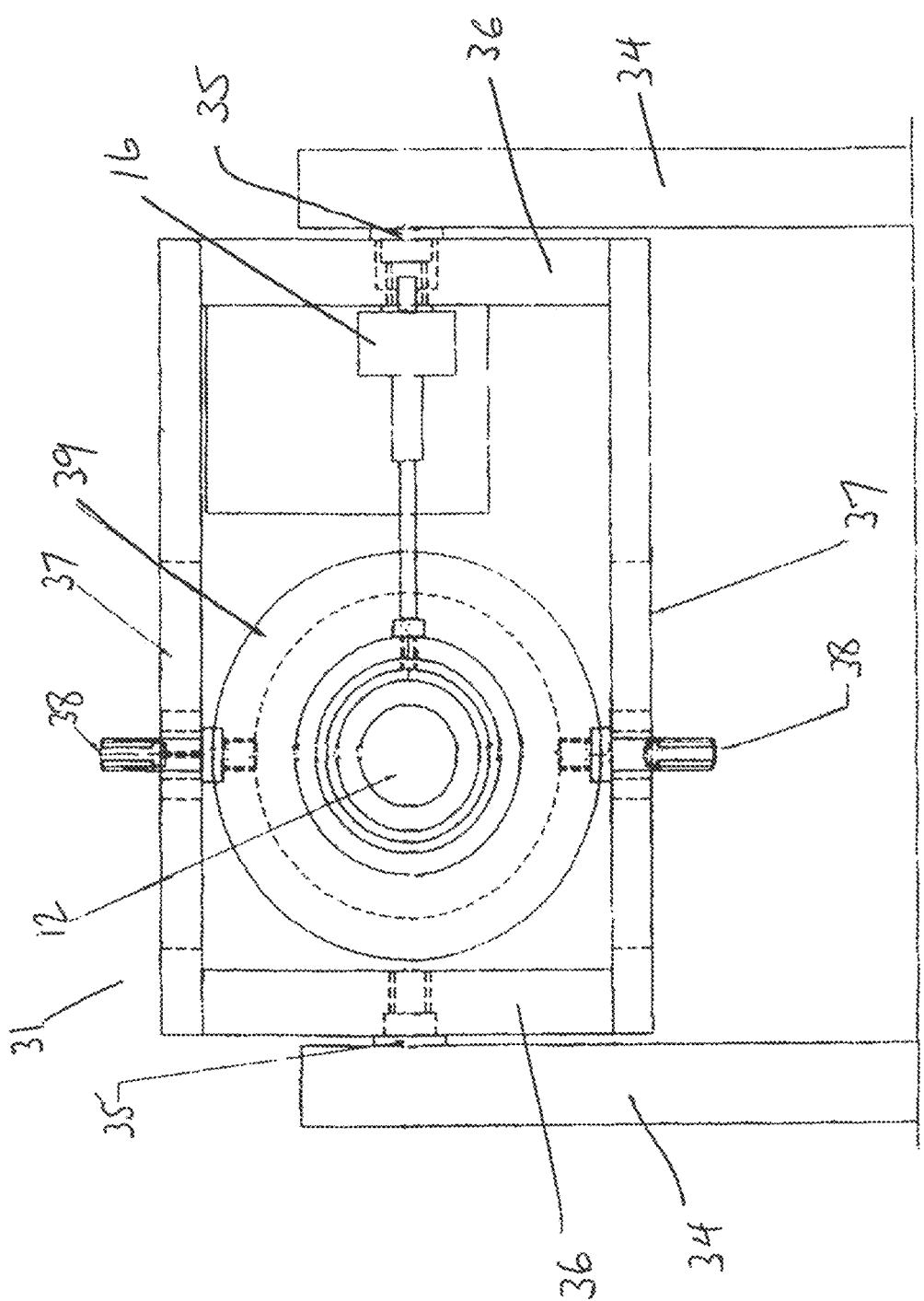
FIG. 3: shows (in a larger scale) a schematic end view, from the left as shown in FIG. 1 or 2, of part of the testing apparatus shown in FIGS. 1 & 2 with the second traction surface in a raised position.

Turning to FIGS. 1 to 4, measuring apparatus 10 is provided having a first traction surface 11 and a second traction surface 12, the surfaces 11 and 12 being arranged to contact one another as can be seen in FIGS. 1 & 2. A support structure, generally designated 13, is provided to support the surfaces 11 and 12 in their respective operating positions whilst allowing a certain amount of relative movement therebetween.

Mounted within the support structure 13 are drive means 14, 15 which are operable to effect respective movement of the traction surfaces 11 and 12 and, thereby, to generate a friction or traction force therebetween which, in use, is measured by force measuring means 16.

The apparatus 10 is characterised in that any traction or friction forces arising between the traction surfaces 11 and 12 are resisted solely by elastic deflection of the support structure and/or elastic deflection of the force measuring means 16.

In the form shown, the traction surfaces 11 and 12 are respectively configured to allow rolling movement with respect to one another. To this end, the first traction surface 11 is preferably a planar surface whilst the second surface 12 has a circular component such that, when the surface 12 is brought into contact with surface 11, rolling traction or friction forces can be generated. More advantageously, the planar first traction surface 11 is provided in the form of a disc mounted for rotation about its central axis by first drive means 14.

The second traction surface 12 is advantageously provided as the surface of a spherical ball mounted for rotation by second drive means 15.

In one particular operating embodiment, the disc 11 is 46.0 mm in diameter and ball 12, 19.05 mm in diameter. Both are formed from polished AISI 52100 bearing steel. They can, of course, be formed from other materials if desired. Both components are designed to be single use items, after which they are disposed of.

The support structure 13 includes first support means 17 to rotatably support the disc 11, and second support means 18 to rotatably support the ball 12, the first support means 12 and second support means 18 being so arranged with respect to each other that the axis of rotation of the ball 12 passes through the axis of rotation of the disc, the intersection of axes coinciding with the centre of the planar contact face of the disc 11. Thus, under pure rolling motion, contacting surface points in the contact patch will have substantially the same speed, so minimising a phenomenon known as spin in the contact. The shape of the contact is circular and is known as a Hertz contact.

More particularly, the first support means comprises bearing block 19 mounted on base chassis 20, the bearing block 19 mounting first drive shaft 21, in bearings 22, in a substantially vertical orientation.

Disc 11 mounts on the upper end of the drive shaft 21, whilst mounted on the lower end of the shaft 21 is a drive pulley 23. Drive pulley 23 receives drive from a further pulley 24 mounted on the output shaft of DC servo motor 25, via drive belt 26.

Formed in the upper part of bearing block 19 is a fluid tight reservoir 27, the reservoir 27 being configured to retain a liquid under test, in a manner such that the contact patch between the disc 11 and ball 12, is immersed in the test fluid. The reservoir 27 is closed by a lid 28 along interface 29 which, as can be seen, is positioned above the contact patch between disc 11 and ball 12.

Electrical heating elements (not shown), or equivalents are provided to heat the contents of the reservoir 27, the temperature preferably being measured by platinum RTD type temperature probes 30. An external refrigerated oil cooler (not shown), or equivalent, may be provided to cool the contents of the reservoir 27.

The upper part of bearing block 19 and the lid 28, which in combination define the reservoir 27, are preferably clad in a PTFE insulating jacket to render the apparatus safe to touch even at the highest test temperatures.

The support structure 13 further includes second support means 31 which supports second drive means 15. The drive means 15 preferably comprises a further DC servo motor, the ball 12 being mounted directly on output shaft 32 of the motor 15 for rotation thereby. The second support means 31 is arranged with respect to the first support means 17 so that the axes of disc 11 and ball 12 lie in a common vertical plane as can be seen in FIG. 1.

The use of independently driven DC servo motors as the drive motors 25 and 15 allows high precision speed control, particularly at low slide/roll ratios.

When in the testing configuration shown in FIGS. 1 and 2, with the ball 12 in contact with the disc 11, the output shaft 32 must pass through the wall which defines reservoir 27. This is advantageously accommodated by ensuring interface 29 is substantially coincident with the axis of shaft 32 when the ball 12 is in the loaded position as shown in FIG. 1. The lid 28 and bearing block 19, are provided, adjacent the interface 29, with co-operating semi-circular cavities (not shown) which, when the lid 28 is place in position over the upper part of bearing block 19 to define the reservoir 27, provide a clearance aperture about the shaft 32. Because interface 29 is above the working liquid level in the reservoir 27, shaft 32 does not need to be sealed where it passes through the reservoir wall. Obviously, if a shaft seal were used, such a seal would apply a resistive torque and reaction force to the shaft 32.

Motor 15 is mounted in a gimbal arrangement 33 mounted, in turn, in brackets 34 extending vertically from base chassis 20. Gimbal 33 is mounted to brackets 34 through stub shafts 35 mounted on a common horizontal axis. This allows the gimbal arrangement 33 to pivot about the horizontal axis and thereby bring the ball 12 into and out of contact with the disc 11. Further, by applying a loading force on the gimbal arrangement 33, about the horizontal axis of shafts 35 the force of ball 12 against disc 11 can be varied without varying any static interactive forces between the two, in orthogonal directions.

Stub shafts 35 project from rigid vertical side plates 36 which form part of the gimbal arrangement 33. Mounted between the upper and lower edges of the side plates 33 are flexures 37. Centrally located within each of the flexures 37, along a common axis orthogonal to the axis of stub shafts 35, are further stub shafts 38. The stub shafts 38 form part of mounting 39 in which motor 15 is mounted.

Each of the flexures 37 is configured and arranged to provide low torsional stiffness about the axis of stub shafts 38 yet provide high stiffness around any other rotational axis or in any translational direction. More importantly, the flexures 37 are configured and arranged to ensure that any resistance to movement, particularly about the axis of stub shafts 38, is purely elastic.

In the embodiment depicted, the flexures 37 comprise four beams 40 which are arranged at right angles and which are relatively thin when viewed vertically as in FIG. 1. Whilst four beams 40 are depicted and described, it will be appreciated, by those skilled in the art, that three, or more than four, beams could be made to function equally effectively.

The beams 40 are preferably machined from aluminium and include a central hub 41 in which stub shafts 38 mount in a non-rotating manner. Thus, any rotation of the motor 15 about the axis of stub shafts 38 is resisted by elastic deformation of the flexure beams 40.

Projecting from the gimbal arrangement 33 is a loading beam 42, the outer end of which is linked to stepper motor 43 and a ball screw actuator to apply a displacement to the beam 42 and thereby displace the ball into and out of contact with disc 11 in a direction normal to the plane of disc 11. Once the ball has made contact with the disc, the actuator will cause the load beam 42 to bend and so, progressively increase the load applied to the disc. After calibration, the magnitude of the load can be precisely measured from the step count on the stepper motor or through strain gauges mounted on the load beam.

Finally, the force measuring means 16 is advantageously mounted on one of the vertical, rigid side plates 36 so as to contact mounting 39, supported in the flexures 37, which moves with the motor 15 and ball 12. Clearly, in this configuration, the force measuring means 16 resists movement of the mounting 39 about the axis of stub shafts 38.

The means 16 comprises a linear force transducer which is very much stiffer than the flexures 37 to maximize the sensitivity of the traction/friction measurement. However, the transducer 16 is also configured to ensure that any displacement thereof is elastic.

Accordingly, it will be appreciated that because the transducer 16 and the flexures 37 form a linear elastic system, the transducer signal is directly proportional to any traction or friction force which arises between ball 12 and disc 11, and so can be calibrated to precisely measure the traction or friction force.

Disc Track Radius Calibration

Figure 4:
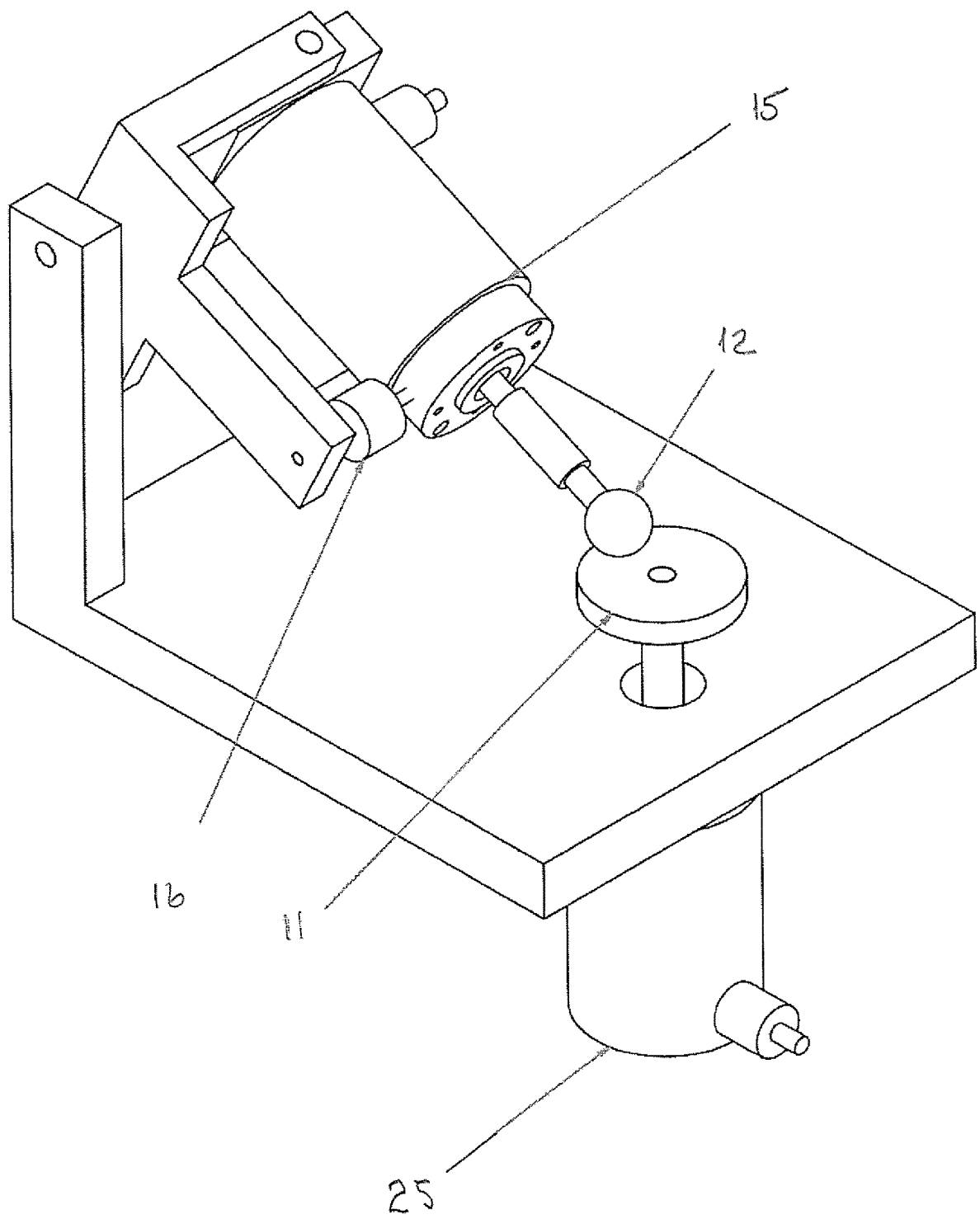
FIG. 4: shows a perspective schematic view of an embodiment of a measuring apparatus according to the invention.
Figure 5:
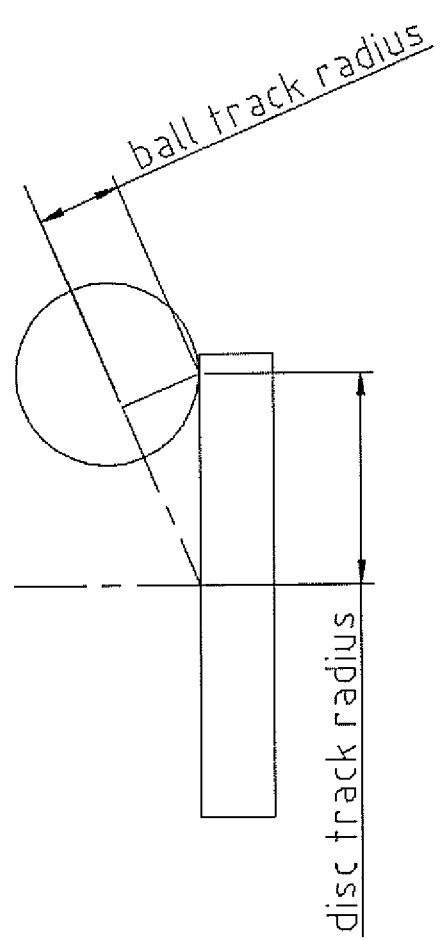
FIG. 5: is a schematic view showing how the disc track radius and the ball track radius are defined, and FIG. 6. show a plot of traction transducer signal against the slide/roll ratio at around zero traction force, derived from use of the apparatus shown in FIGS. 1 to 4.

Referring to FIGS. 4 and 5, the ball 12 contacts the disc 11 at an angle such that the ball axis passes through the centre axis of the contact plane of the disc. This minimises a phenomenon known as spin in the contact. The ball 12 and disc 11 are driven independently by two servo motors, the ball motor 15 and the disc motor 25.

This allows the ball and disc contact surfaces to run at the same speeds as would be required to produce pure rolling or to introduce a controlled amount of sliding into the contact. The ratio of sliding to rolling is known as the slide/roll ratio or SRR. If the disc speed is Ud and the ball speed is Ub then the SRR is defined as the sliding speed divided by the rolling speed and can be expressed as a percentage.

$$SRR=200*(Ud-Ub)/(Ud+Ub)$$

The friction or traction force between the ball and disc is measured by a traction transducer 16.

The apparatus is used primarily for making very high accuracy traction measurements of sample fluids over a range of SRR. In order to accurately set the contact speeds of the ball 12 and disc 11, the motor rotational speeds and the ball track radius and disc track radius, see FIG. 5, need to be known. The motor speeds can be determined using high resolution encoders but the ball track radius and disc track radius are not exactly known. The ball track radius can be calculated from the angle of the ball axis which is accurately specified and fixed. The disc track radius though changes from instrument to instrument through manufacturing tolerances and during a test through thermal expansion and elastic deflections under load.

Accordingly a method is provided herein to determine the disc track radius (DTR) during periodic calibration or, if making measurements at very low SRR, just before the measurement is made. One way to determine the DTR is to steadily increase the disc speed and reduce the ball speed (or vice versa) in such a way as to ensure that at some point the speeds pass through a point where the disc and ball are in pure rolling. As the speeds pass through this point, the direction of sliding, and therefore the direction of traction force, will be reversed, which results in the chart as shown for example in FIG. 6. Therefore the motor speeds and traction force are recorded, and the pure rolling point can be determined and using the two motor speeds and the ball track radius, the DTR can be determined.

$$DTR = Ub \times \text{ball track radius}/Ud$$

This measurement can be made either using a dry contact such as for example between a steel ball and a PTFE disc or using a lubricated contact such as for example between a steel ball and steel disc immersed in oil. Using a dry contact, the transition from positive to negative traction as the contact passes through the pure rolling point is quite well defined but for the more common case of lubricated contacts the transition is less well defined. In this case the point at which the traction force is zero needs to be determined.

The traction transducer is calibrated so that the ratio of change in traction transducer signal to change in traction force is very accurately defined. This gain value remains very stable. However the zero offset from the transducer can drift a little through thermal or electronic effects. To eliminate this drift two traction measurements are made for each traction output value.

In an exemplary embodiment, one is made at a positive SRR, eg +5% and one at the same value negative SRR, eg −5%.

The second value can then be subtracted from the first value and the result halved so eliminating the effect of zero offset. For example, indicated traction force at:

+5% SRR traction value=12 N
−5% SRR traction value=−7 N $$\text{Traction force} = (12 - -7)/2 = 19/2 = 9.5 \text{ N}$$

In this case then the zero offset is 2.5 N but this did not need to be known prior to the measurements.

Figure 6:
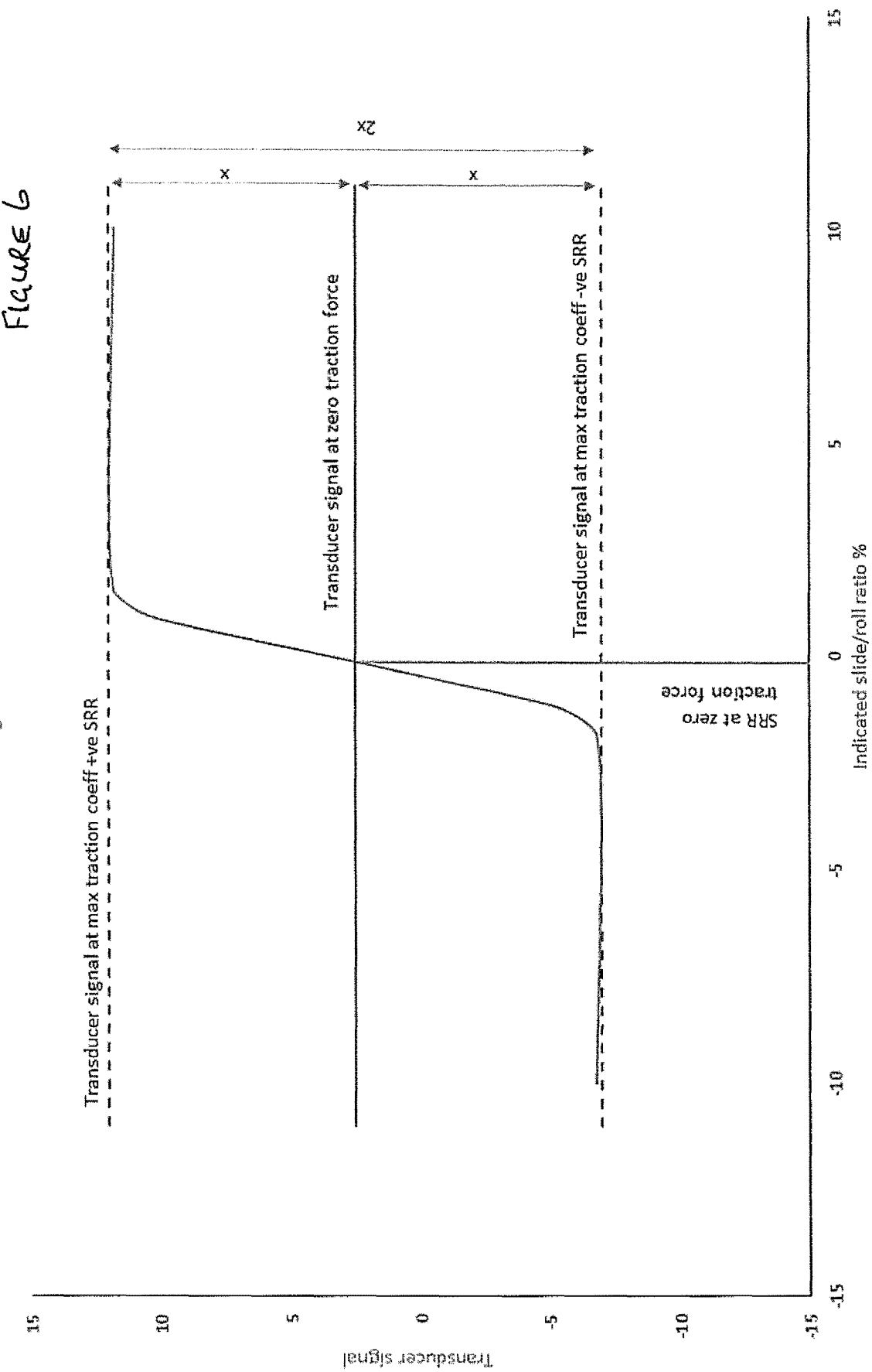

Additionally, in order to make the DTR calibration the zero traction force transducer signal also needs to be known. One way to do this is to make two traction measurements as described above at a slide/roll ratio where a fluid tends to have a fairly constant traction coefficient for small changes in SRR, normally around the maximum traction coefficient value, such that small errors in SRR will have negligible impact on the traction force measurement. Then having established the zero traction force point, as the midpoint between the two traction force measurements, to step through a series of progressively increasing and decreasing disc and ball speeds either side of the estimated pure rolling speeds. This can be most accurately accomplished using a fluid known as a traction fluid, which has a very steep traction slope at low slide roll ratios and then reaches a maximum after which the coefficient stays fairly constant as illustrated in FIG. 6. An example of a suitable traction fluid is Santotrac 40. Whereas with most lubricants especially at lower contact pressures the traction coefficient tends to rise with increasing SRR.

According to this embodiment of the method of the invention two measurements can be made at SRR's nominally corresponding to the maximum traction coefficient values to determine the zero traction force value then a series of measurements over a narrow range of SRRs from, for example +1% to −1% in steps of 0.1%. Then using interpolation the exact indicated SRR can be determined where the traction force is zero. The DTR can then be adjusted such that the indicated SRR is also equal to zero.

For example

DTR=21 mm, indicated SRR at zero traction force=−0.15%

Corrected $DTR = 21 \times 1.0015 = 21.0315$ mm

In use, before testing is commenced, the reservoir 27 is carefully cleaned and dried. Among suitable solvents for cleaning the reservoir are white spirits or varsol followed by iso-octane or heptane. In general, the first solvent should be chosen to give good removal of the types of lubricant under investigation, whilst the second solvent should be chosen to give a clean, dry surface.

After application of the solvents, the reservoir is dried with a hot air dryer or with an air or nitrogen line. Alternatively, the reservoir can be filled with solvent which is then vacuumed out drying the reservoir in the process.

The disc and ball must be carefully cleaned prior to use, with particular care being taken to remove any protective surface coatings (such as anti-corrosive coatings) applied to prevent deterioration of the components prior to use. Cleaning can be effected using a soft tissue and then the disc and ball placed in separate beakers containing iso-octane or another suitable solvent. Each component is then cleaned in an ultrasonic cleaner for 2 minutes, the solvent then replaced with clean solvent, and cleaning resumed for another 10 minutes. The solvent is then replaced again and cleaning effected for a further 10 minutes, after which the components are dried with a clean, dry air line or with a nitrogen line.

The disc 11 and ball 12 are then mounted securely on their respective drive shafts.

Once the disc 11 and ball 12 have been secured in place, a number of tests can be conducted for a given lubricant under test. Each test will have a given temperature, normal load, speed and slide/roll ratio.

These parameters may advantageously be stored in a computerised control system which cycles through the various tests, collecting and storing measurements from the force transducer 16 as it goes.

It will thus be appreciated that the present invention provides a form of traction and/or friction measuring apparatus which eliminates nonpredictive forces from the test componentry, is compact in form and, at least in the preferred embodiment described, cycles through a variety of tests with the minimum of human intervention.

The invention claimed is:

1. A method of determining Disk Track Radius (DTR) in a traction or friction measuring apparatus, said apparatus comprising a disc including a flat disc traction surface; a ball including a spherical ball traction surface constructed and arranged to, in use, contact said disc traction surface; a support structure constructed and arranged to support said disc and ball traction surfaces with respect to one another whilst allowing relative rotational movement therebetween; a disc drive motor and a ball drive motor operable to drive said disc and said ball, respectively, to effect the relative movement between said disc and ball traction surfaces to generate a traction or friction force therebetween; disc speed measuring means and ball speed measuring means for measuring the speed of the disc and the ball, respectively; and force measuring means associated with at least said disc and ball traction surfaces to provide a force measurement arising from said traction or friction force and wherein measurement of ball speed and disc speed can be made at a point of pure rolling between the ball and disc in order to determine a disc track radius (DTR) based on a known ball track radius, said method comprising the following steps:

establishing contact between the spherical ball traction surface of the ball and the flat disc traction surface of the disc;

steadily increasing the disc speed and reducing the ball speed (or vice versa) in such a way as to ensure that at some point the speeds pass through a point where the disc and ball are in pure rolling contact, wherein said point where the disc and ball are in pure rolling contact is determined when said disc speed and ball speed are equal such that there is no slippage between the disc traction surface and the ball traction surface;

measuring ball speed and disc speed at said point when said disc and ball are in pure rolling contact;

measuring traction force between the ball and the disc and plotting traction force against a slide/roll ratio (SRR), wherein the slide/roll ratio (SRR) is calculated as a difference in speed between the disc speed and ball speed divided by the average of the disc speed and ball speed and expressed as a percentage according to the following formula in which Ud is disc speed and Ub is ball speed and:

$$SRR=200*(Ud-Ub)/(Ud+Ub);$$

wherein said step of measuring ball speed and disc speed and said step of measuring traction force comprise observing and recording motor speed values of the disc drive motor and the ball drive motor that correspond respectively to said disc speed and the ball speed at a point of transition from positive to negative or negative to positive traction force as the contact passes through pure rolling contact when said disc speed and ball speed are equal without slippage between the disc traction surface and the ball traction surface when SRR=0%, and, using said known ball track radius and the measured ball speed and the measured disc speed during pure rolling contact to determine the disc track radius (DTR) based on the formula:

$$DTR=\text{Ball speed} \times \text{ball track radius}/\text{Disc speed}.$$

2. The method of determining Disk Track Radius (DTR) according to claim 1, wherein said step of measuring traction force comprises taking a first traction measurement at a positive SRR value, and taking a second traction measurement at a negative SRR value that is equal in magnitude to the positive SRR value, and wherein the second traction measurement is then subtracted from the first traction measurement and the result halved to give a true traction value by eliminating the effect of any offset drift.

3. The method of determining Disk Track Radius (DTR) according to claim 2, wherein either a dry contact between the traction surfaces, or a contact fluid is used that exhibits both a first traction slope at a first SRR and a second traction slope at a second SRR where the traction value is at a maximum, the first traction slope being greater than the second traction slope, and the first SRR being less than the second SRR.

4. The method of determining Disk Track Radius (DTR) according to claim 3, further comprising the following steps:
a) establishing a zero traction force point using a dry contact or contact fluid and making a measurement at a higher SRR where the traction value is at a maximum,
b) stepping through a series of progressively increasing and decreasing disc and ball speeds at the first SRR either side of an estimated pure rolling speed using a dry contact or contact fluid and recording the traction values,
c) recording the SRR at which the recorded traction value in step b) is equal to the zero traction force point in step a),
d) adjusting the disc track radius (DTR) such that the indicated SRR is equal to zero.

5. The method of determining Disk Track Radius (DTR) according to claim 1, wherein said disc traction surface is rotated about a substantially vertical axis.

6. The method of determining Disk Track Radius (DTR) according to claim 5, wherein said ball traction surface is displaced about a substantially horizontal axis into contact with said disc traction surface.

7. The method of determining Disk Track Radius (DTR) according to claim 1, further comprising permitting elastic movement of said ball traction surface with respect to said disc traction surface in a direction of said traction force or friction force and resisting movement of said ball traction surface in orthogonal directions that are oriented orthogonally relative to said traction force and said friction force.

8. The method of determining Disk Track Radius (DTR) according to claim 1, further comprising variably displacing said ball traction surface into contact with said disc traction surface in a displacement direction normal to said disc traction surface.

9. The method of determining Disk Track Radius (DTR) according to claim 8, wherein the step of variably displacing said ball traction surface into contact with said disc traction surface in a direction normal to said disc traction surface comprises using a stepper motor to displace said ball traction surface.

10. The method of determining Disk Track Radius (DTR) according to claim 1, wherein said force measuring means comprises a linear force transducer, said method further comprising using said linear force transducer to detect force applied to said ball traction surface due to a traction or frictional engagement with said disc traction surface.

11. The method of determining Disk Track Radius (DTR) according to claim 1, wherein said step of establishing contact between the spherical ball traction surface of the ball and the flat disc traction surface of the disc comprises maintaining a contact patch between the spherical ball traction surface and the flat disc traction surface immersed in a liquid.

12. The method of determining Disk Track Radius (DTR) according to claim 11 further comprising heating said liquid.

* * * * *